(12) United States Patent
Matsunaga

(10) Patent No.: US 6,830,722 B2
(45) Date of Patent: Dec. 14, 2004

(54) METHOD OF MANUFACTURING PNEUMATIC TIRE AND VULCANIZING METAL MOLD USED FOR THE METHOD

(75) Inventor: Hiroo Matsunaga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 325 days.

(21) Appl. No.: 10/089,545

(22) PCT Filed: Aug. 3, 2001

(86) PCT No.: PCT/JP01/06703

§ 371 (c)(1),
(2), (4) Date: Apr. 1, 2002

(87) PCT Pub. No.: WO02/14042

PCT Pub. Date: Feb. 21, 2002

(65) Prior Publication Data

US 2002/0185204 A1 Dec. 12, 2002

(30) Foreign Application Priority Data

Aug. 4, 2000 (JP) ........................ 2000-236560

(51) Int. Cl.⁷ ............................................. B29C 35/00
(52) U.S. Cl. .................. 264/326; 264/325; 425/32; 425/195
(58) Field of Search ................................ 264/219, 325, 264/326; 425/32, 38, 46, 47, 195

(56) References Cited

U.S. PATENT DOCUMENTS

| | | |
|---|---|---|
| 1,534,777 A | 4/1925 | Frank |
| 4,573,894 A | 3/1986 | Blayne et al. |
| 4,940,069 A | 7/1990 | Nakaski et al. |
| 5,261,804 A * | 11/1993 | Jachowsky .................. 425/47 |
| 5,382,402 A * | 1/1995 | Espie et al. ................ 264/326 |
| 5,798,076 A | 8/1998 | Ladouce |
| 5,939,002 A * | 8/1999 | Heindel ..................... 264/219 |
| 6,491,854 B1 * | 12/2002 | Sano ......................... 264/219 |

FOREIGN PATENT DOCUMENTS

| | | |
|---|---|---|
| EP | 0 726 174 A1 | 8/1996 |
| EP | 0 872 324 A2 | 10/1998 |
| JP | 51-119776 A | 10/1976 |
| JP | 63-151410 A | 6/1988 |
| JP | 63 264308 A | 11/1988 |
| JP | 1-145208 A | 6/1989 |
| JP | 8-47929 A | 2/1996 |
| JP | 08 047929 A | 2/1996 |
| JP | 8-267457 A | 10/1996 |
| JP | 10 044156 A | 2/1998 |
| JP | 11-157310 A | 6/1999 |

* cited by examiner

Primary Examiner—James Sells
(74) Attorney, Agent, or Firm—Sughrue Mion, PLLC

(57) ABSTRACT

It is a method of manufacturing a pneumatic tire provided with a bead guard having an excellent appearance without forming spews and bare, wherein when a pneumatic tire (1) provided with a bead guard (5) of a trapezoidal shape at section is vulcanization-shaped in a split type mold (11) comprising a pair of annular side rings (13) and many divided segments (12) for the formation of a tread portion integrally united and engaged therewith, an edge (13-1 SE, 13-2iSE) of a dividing face (13-1S, 13-2iS) between mutually adjoining side ring pieces (13-1, 13-2) formed by annularly dividing a side ring (13) inward and outward in a radial direction with respect to a center axis line of the split type mold (11) and located at a side of a tire shaping face is positioned in a place corresponding to a depressing portion (15) forming a bead guard (5).

13 Claims, 3 Drawing Sheets

METHOD OF MANUFACTURING PNEUMATIC TIRE AND VULCANIZING METAL MOLD USED FOR THE METHOD

This is a National Stage entry under 35 U.S.C. §371 of International Patent Application No. PCT/JP01/06703 filed Aug. 3, 2001, the entire disclosure of which is incorporated herein by reference.

TECHNICAL FIELD

This invention relates to a method of manufacturing a pneumatic tire and a vulcanization mold used therefor, and more particularly to a method of manufacturing a pneumatic tire comprising a bead portion provided with a protruding portion of, for example, a trapezoidal shape at its section, which is called as a bead guard, through vulcanization-shaping and a vulcanization split type mold for realizing the vulcanization-shaping in this method. Especially, the invention provides a bead guard showing a good appearance.

BACKGROUND ART

In the vulcanization-shaping of a radial ply tire among pneumatic tires, it is general to use a split type mold as a vulcanization mold capable of advantageously coping with a high precision finishing and a variety of tread patterns in the tire. All the tire described hereinafter indicates a radial ply tire.

The split type mold comprises a pair of side rings forming a pair of bead portions and a pair of sidewall portions of a pneumatic tire, and many split segments for the formation of a tread portion of the pneumatic tire each freely going in and out inward and outward in a radial direction with respect to a center axis line of the side ring and engaging with the respective side ring as mentioned later in detail.

An integrally engaged face between the side ring and the segment is existent in a position corresponding to an inward of the tire tread portion in a radial direction. And also, the side ring has an integrally engaged face with a bead ring shaping a part of a bead portion extending outward from a bead base in the radial direction, more concretely up to a neighborhood of a central position of a flange height of an approved rim to be mounted with the tire during vulcanization.

When an uncured tire held in the split type mold is subjected to a vulcanization-shaping, a pressurized gas is filled into an inner face of the uncured tire to push the uncured tire onto the split type mold. As a result, air reservoirs are created between the split type mold and the uncured tire though the number of the air reservoirs is far less than that in a conventional full mold or so-called two-split mold. As the vulcanization proceeds at such a state, a rough face called as bare is formed in a cured tire to remarkably impair an appearance of the tire.

Even in the split type mold, therefore, through-type ventholes for venting air are disposed in many places easily causing the bare. In this case, rubber flowed into an inside of the venthole during the vulcanization renders into many spew rubbers protruded from a surface of a tire after the vulcanization-shaping. Since it is required to remove these spew rubbers at a separate trimming step, there are caused problems that the number of working steps increases and direct material cost and industrial waste cost spoil and the appearance is impaired by trimmed traces.

For this end, it is variously attempted to largely decrease the number of the ventholes or remove them, but complete removal is not still attained.

When a pneumatic tire comprising a bead guard is vulcanization-shaped in the split type mold, an air reservoir is apt to be formed in a depressing portion of the side ring for the formation of the bead guard protruding outward from the tire on a circumference of the bead portion and frequently shaping into a torus.

The reserved air is compressed through rubber by a pressure of a high-pressure gas acting to an inside of an uncured tire. A part of the compressed air is scattered and lost around the depressing portion, while the remainder is particularly crowded between a corner part of the protruded portion like the bead guard at the outer surface of the tire and a bottom corner part of the depressing portion of the side ring corresponding thereto to create the bare in the corner part of the bead guard.

The thus created bare considerably imparts the appearance of the tire but also causes a problem that the bead guard remarkably comes off from an expected shape.

In order to prevent the occurrence of such bears, it is required to dispose many ventholes in the bottom corner part of the depressing portion of the side ring as previously mentioned. In this case, however there are caused the aforementioned problems and also an operation for removing spews from a top corner part of the bead guard is particularly such a delicate operation that damage must not be given to the top corner part and brings in difficulty at the removal through mechanical operation, which is different from the case of removing spews at the other tire positions. Further, since such a protruding portion is easily noticeable, it is apt to remarkably impart an appearance of the tire by traces damaging the top corner parts and spew-removed traces.

Therefore, the invention aims at a pneumatic tire comprising a bead guard in its bead portion and is to provide a method of manufacturing a pneumatic tire capable of forming a bead guard having an excellent appearance without creating bare trouble and spew in the bead guard and a vulcanization mold usable for carrying out this method.

DISCLOSURE OF THE INVENTION

According to the invention, there is a method of manufacturing a pneumatic tire comprising a tread portion, a pair of sidewall portions and a pair of bead portions communicating with both sides of the tread portion, and a bead guard disposed in at least one bead portion and protruding outward from the tire by vulcanization-shaping with a split type mold comprising a pair of annular side rings forming the pair of bead portions and the pair of sidewall portions and many split segments for the formation of the tread portion integrally united and engaged with the respective side ring, characterized in that an edge of a dividing face between mutually adjoining side ring pieces by annularly dividing the side ring inward and outward in a radial direction with respect to a center axis line of the split type mold and located at a side of a tire shaping face is positioned in a place corresponding to a depressing portion forming a bead guard, more preferably a place corresponding to a bottom of the depressing portion.

It is favorable that the edge of the dividing face between the mutually adjoining side ring pieces located at the side of the tire shaping face is positioned in a place corresponding to a corner part of the depressing portion forming the bead guard.

When an uncured tire is pushed onto a shaping face of the mold, air is easily escaped into such a place that a flow-displaced or deformed rubber of the uncured tire arrives at the shaping face of the mold at a rate slower than that of the other rubber portion and hence the bare is easily caused in such a place, so that when there are plural corner parts, it is favorable to position the edge of the dividing face between the mutually adjoining side ring pieces located at the side of the tire shaping face in a place corresponding to a deeper corner part.

On the other hand, when the uncured tire is gradually enlarged and deformed from inward to outward in the radial direction by using, for example, a shaping bladder in the vulcanization-shaping, it is favorable that the edge of the dividing face between the mutually adjoining side ring pieces located at the side of the tire shaping face is positioned in a place corresponding to an outward corner part in the radial direction at a side delaying the enlarging deformation of the uncured tire among corner parts adjoining to each other inward and outward in the radial direction in the depressing portion forming the bead guard.

A vulcanization mold usable for carrying out the manufacturing method according to the invention is a vulcanization split type mold comprising a pair of annular side rings forming a pair of bead portions and a pair of sidewall portions of a pneumatic tire, many split segments for the formation of a tread portion of the pneumatic tire each freely going in and out inward and outward in a radial direction with respect to a center axis line of the side ring and engaging with the respective side ring and a depressing portion formed in at least one side ring for the formation of a bead guard protruding outward from the pneumatic tire in the bead portion, and is characterized in that the side ring is constructed with two or more side ring pieces annularly divided inward and outward in a radial direction with respect to a center axis line of the split type mold, and the depressing portion is formed in at least two adjoining side ring pieces, and an edge of a dividing face between the mutually adjoining side ring pieces located at a side of a tire shaping face is positioned in the depressing portion, preferably a bottom of the depressing portion.

In a preferable embodiment of such a mold, the edge of the dividing face between the mutually adjoining side ring pieces disposed in the depressing portion and located at the side of the tire shaping face is positioned in a corner part at the bottom of the depressing portion.

When plural corner parts are existent in the bottom of the depressing portion forming the bead guard, it is favorable that the edge of the dividing face between the mutually adjoining side ring pieces forming the depressing portion and located at the side of the tire shaping face is positioned in a deepest bottom corner part among the plural bottom corner parts, or that the edge of the dividing face between the mutually adjoining side ring pieces forming the depressing portion and located at the side of the tire shaping face is positioned in an outward bottom corner part in the radial direction among the plural bottom corner parts separated away from each other in the radial direction of the depressing portion.

Thus, as previously mentioned, ventilation can be smoothly and surely realized from such a most easily air reserving portion that the uncured tire most lately contacts with the tire shaping face of the mold.

Preferably, each of the side rings is divided into three or more side ring pieces.

More preferably, a chamfered portion specifying a position of the edge of the dividing face located at the side of the tire shaping face is formed in at least one of the mutually adjoining side ring pieces.

Further, it is favorable that the side ring pieces in each of the side rings have a structure capable of assembling and dissembling them and are integrally united with each other in a vulcanization work including open-close of a vulcanizing machine provided with the mold.

BEST MODE FOR CARRYING OUT THE INVENTION

A pneumatic tire (hereinafter referred to as a tire) 1 showing only a sectional outline in FIG. 1 comprises a tread portion 2, a pair of sidewall portions (only one-side portion is shown) 3 and a pair of bead portions (only one-side portion is shown) 4 communicating with both sides of the tread portion 2.

At least one of the bead portions 4 is provided with a bead guard 5 protruding outward from the tire and extending continuously or disconnectedly on a circumference of the bead portion so as to take approximately an annular shape as a whole. The bead guard 5 may have, for example, substantially a sectional shape of a polygon, a mountain or the like, and the illustrated embodiment has a sectional shape of a trapezoid. Moreover, when the tire 1 is a run-flat tire, the bead guard 5 is disposed on each of both bead portions 4.

Furthermore, the tire 1 comprises a carcass of one or more rubberized plies of radially arranged cords and a belt located on an outer circumference of the carcass according to the custom though they are not illustrated.

Figure 1:
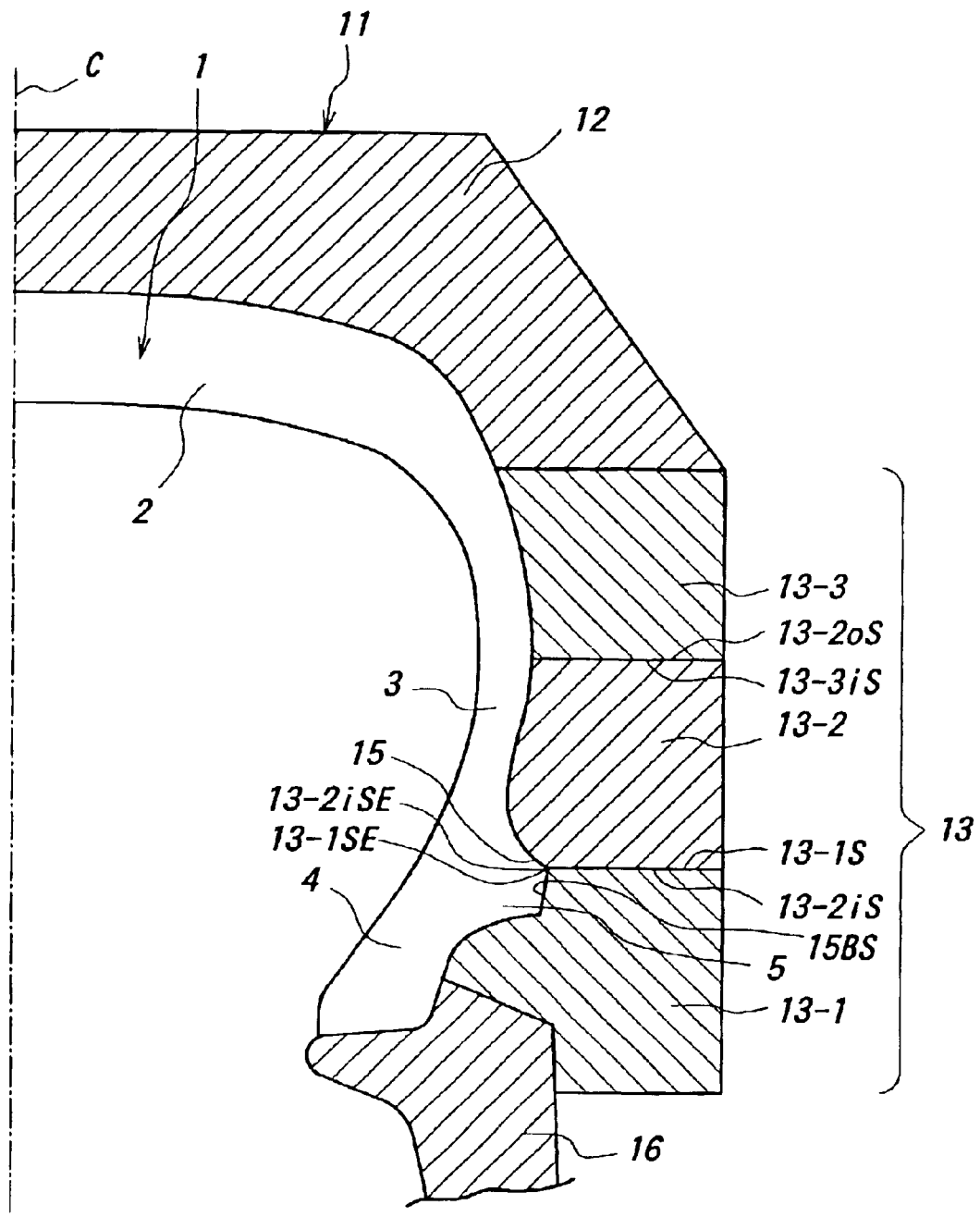
FIG. 1 is a diagrammatically right-half section view of a vulcanization mold according to the invention together with a pneumatic tire vulcanization-shaped therein.

The tire 1 shown in FIG. 1 is a state just after the completion of vulcanization-shaping in a cavity of a split type mold 11. The split type mold 11 usually mounted on a vulcanizing machine (not shown) at a horizontal state comprises many split segments 12 forming the tread portion 2 of the tire 1 and a pair of upper and lower annular side rings 13 forming the pair of the sidewall portions 3 and the pair of the bead portions 4. The segments 12 are arc-shaped bodies of a tread ring divided in a circumferential direction of the tread portion 2. These segments 12 have a structure of freely going in and out inward and outward in a radial direction with respect to a center axis line (not shown) of the split type mold 11.

More detailedly, the segments 12 are moved outward from a position shown in FIG. 1 up to a waiting place in a radial direction at a non-working time and moved inward in the radial direction at a working time so as to locate in the position shown in FIG. 1 by a radially moving means (not shown) with respect to the above center axis line.

On the other hand, a lower side ring 13 in the pair of upper and lower side rings 13 is fixed to a lower portion of the vulcanizing machine, while an upper side ring 13 is fixed to an upper portion of the vulcanizing machine capable of moving in up-down directions. In the invention, at least one of the side rings 13 is provided with an approximately annular depressing portion 15 forming the bead guard 5 disposed on the bead portion 4 of the tire 1. When each of the bead portions 4 is provided with the bead guard 5, each of the upper and lower side rings 13 is provided with the depressing portion 13. Moreover, a center axis line of the pair of the side rings 13 forms a center axis line of the split type mold 11 at the above fixation position. Hereinafter, they are called as a center axis line.

Numeral 16 is a bead ring engaging with the side ring 13 and forming a part of the bead portion 4.

When an uncured tire having a toroidal shape near to the tire 1 is placed and vulcanization-shaped in the split type mold 11 under the above structure constituted with the segments 12 and the pair of the side rings 13, the segments 12 are moved inward from the waiting places in the radial direction and integrally united and engaged with each of the pair of the side rings 13.

Here, the side ring 13 provided with the depressing portion 15 is divided into two or more annular bodies at inside and outside in the radial direction with respect to the center axis line. Each of these divided bodies is called as a side ring piece.

The split type mold 11 shown in FIG. 1 comprises three divided side ring pieces 13-1, 13-2, 13-3. They are united together and placed in the vulcanizing machine. In these united side ring pieces 13-1 to 13-3, mutually adjoining dividing faces 13-1S, 13-2$i$S as well as 13-2$o$S, 13-3$i$S have an extremely slight space forming an air path but not permitting flow-in of rubber during the vulcanization-shaping of the tire 1.

Figure 3:
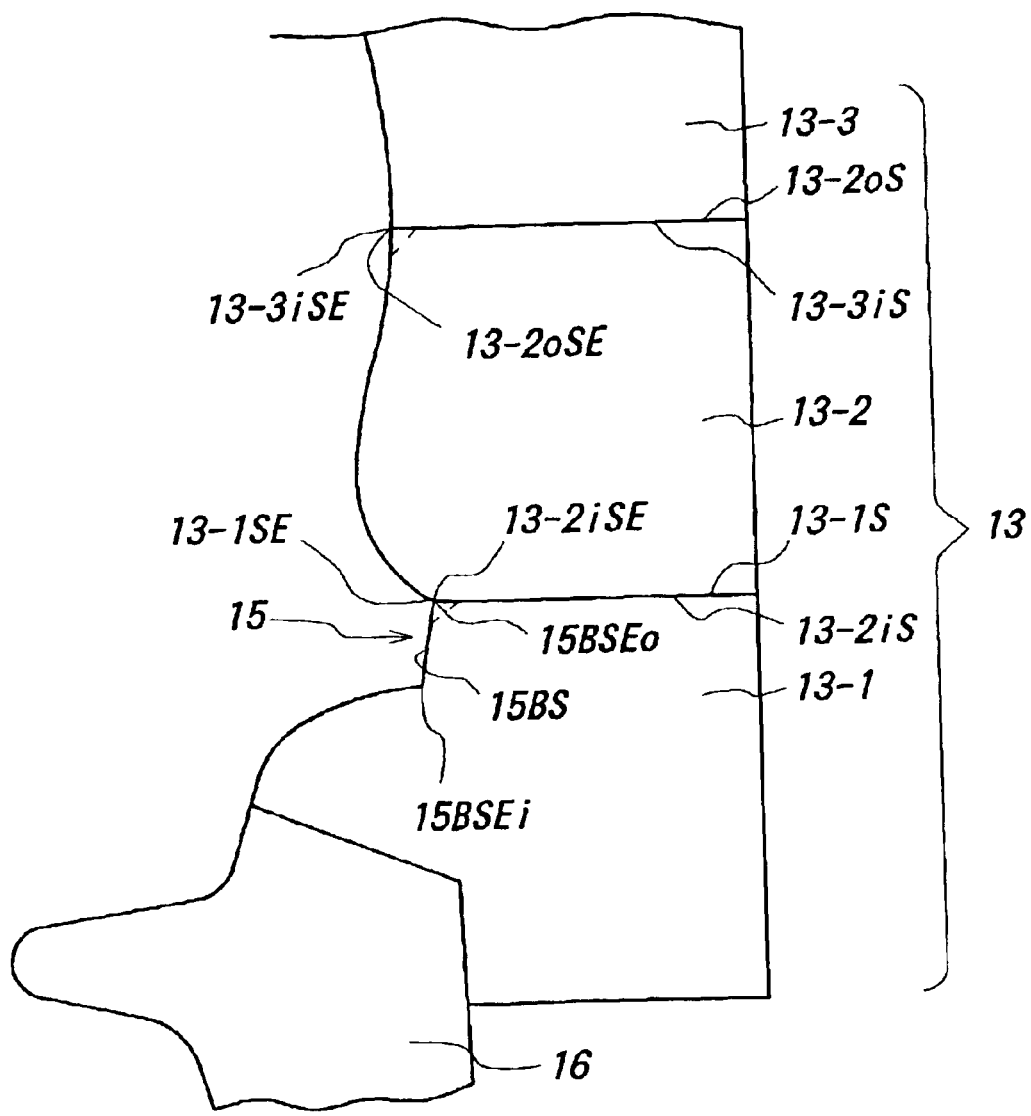
FIG. 3 is an enlarged section view of a main part of the split type mold shown in FIG. 1.

As shown in FIGS. 1 and 3, at least two side ring pieces, mutually adjoining two side ring pieces 13-1, 13-2 in the illustrated embodiment have edges 13-1SE, 13-2$i$SE of the dividing faces 13-1S, 13-2$i$S located at a side of a tire shaping face on a bottom 15BS of the depressing portion 15. In the depressing portion 15 is never disposed venthole or the like.

Thus, when the tire 1 is vulcanization-shaped by using the above split type mold 11, the edges 13-1SE, 13-2$i$SE of the dividing faces 13-1S, 13-2$i$S of the mutually adjoining side ring pieces 13-1, 13-2 located at the side of the tire shaping face are position on an outer surface 5OS of the bead guard 5 protruding from the bead portion 4, so that the bead guard 5 is vulcanization-shaped in the depressing portion 15 defined between the respective side ring pieces 13-1, 13-2 at inside and outside in the radial direction with respect to these edges 13-1SE, 13-2$i$SE.

During the time ranging from the start of the vulcanization-shaping to the curing of rubber with the split type mold 11, air trapped and pressurized between rubber forming the bead guard 5 and the depressing portion 15 is smoothly discharged from the edges 13-1SE, 13-2$i$SE of the adjoining side ring pieces 13-1, 13-2 through the dividing faces 13-1S, 13-2$i$S to an outside of the split type mold 11 without forming venthole or the like in the depressing portion 15, so that the occurrence of bare is effectively prevented.

As a result, not only spew but also "rubber burr" are not formed on the bead guard 5, so that a good, unhurt appearance of the bead guard having an expected shape can be provided and an extra finishing step is useless.

Furthermore, the edges 13-1SE, 13-2$i$SE located at the side of the tire shaping face are arranged on the adjoining side ring pieces 13-1, 13-2 having the depressing portion 15 in at least one of radially inner corner part 15BSEi and radially outer corner part 15BSEo of the bottom 15BS of the depressing portion 15 corresponding to radially inner corner part 5OSEi and radially outer corner part 5OSEo of the outer surface 5OS of the bead guard 5 protruding from the tire 1, the radially outer corner part 15BSEo in FIGS. 1 and 3.

According to such a structure, in the vulcanization-shaping of the tire 1, the edges 13-1SE, 13-2$i$SE of the side rings are positioned in at least one of the radially inner corner part 5OSEi and outer corner part 5OSEo at the outer surface 5OS of the bead guard 5, whereby an escape path can be given to air usually reserved in the corner part of the depressing portion 15 corresponding to at least one of the corner part 15BSEi, 15BSEo of the bottom 15BS.

In this connection, it is favorable to arrange the edges 13-1SE, 13-2$i$SE located at the side of the tire shaping face on the adjoining side ring pieces 13-1, 13-2 having the depressing portion 15 in the outer corner part 15BSEo of the bottom 15BS of the depressing portion 15 forming the radially outer corner part 5OSEo among the corner parts 5OSEi, 5OSEo of the outer surface 5OS of the bead guard 5 separated away from each other in the radial direction, or a deeper part among corner parts 15BSEi, 15BSEo existing in the bottom 15BS of the depressing portion 15, bottom corner part 15BSEo in the illustrated embodiment.

That is, the edges 13-1SE, 13-2$i$SE of the dividing faces of the side ring pieces are position in the radially outer corner part 5OSEo among the corner parts 5OSEi, 5OSEo of the outer surface 5OS of the bead guard 5 separated away from each other in the radial direction, or the deepest bottom corner part 15BSEo of the depressing portion 15 in the vulcanization-shaping of the tire 1, whereby smooth ventilation can be conducted from a most air reservable portion as previously mentioned.

And also, it is favorable that each of the pair of the side rings 13 is constituted with three or more divided side ring pieces 13-1, 13-2, 13-3, . . . 13-n (natural number of not less than n=1). In this way, it is possible to wipe out inferior bare without arranging ventholes in each side ring 13 contributing to the formation of the sidewall portion 3 of the tire 1, namely forming spews in the sidewall portion 3.

Preferably, as shown by a phantom line in FIG. 3, a chamfered portion specifying edges 13-1SE, 13-2$i$SE 13-2$o$SE, 13-3$i$SE of the dividing faces located at the side of the tire shaping face is arranged in at least one of the adjoining side ring pieces 13-1, 13-2 and the adjoining side ring pieces 13-2, 13-3. FIG. 3 shows a case of arranging the chamfered portions in the radially inner side ring pieces 13-1, 13-2.

Figure 2:
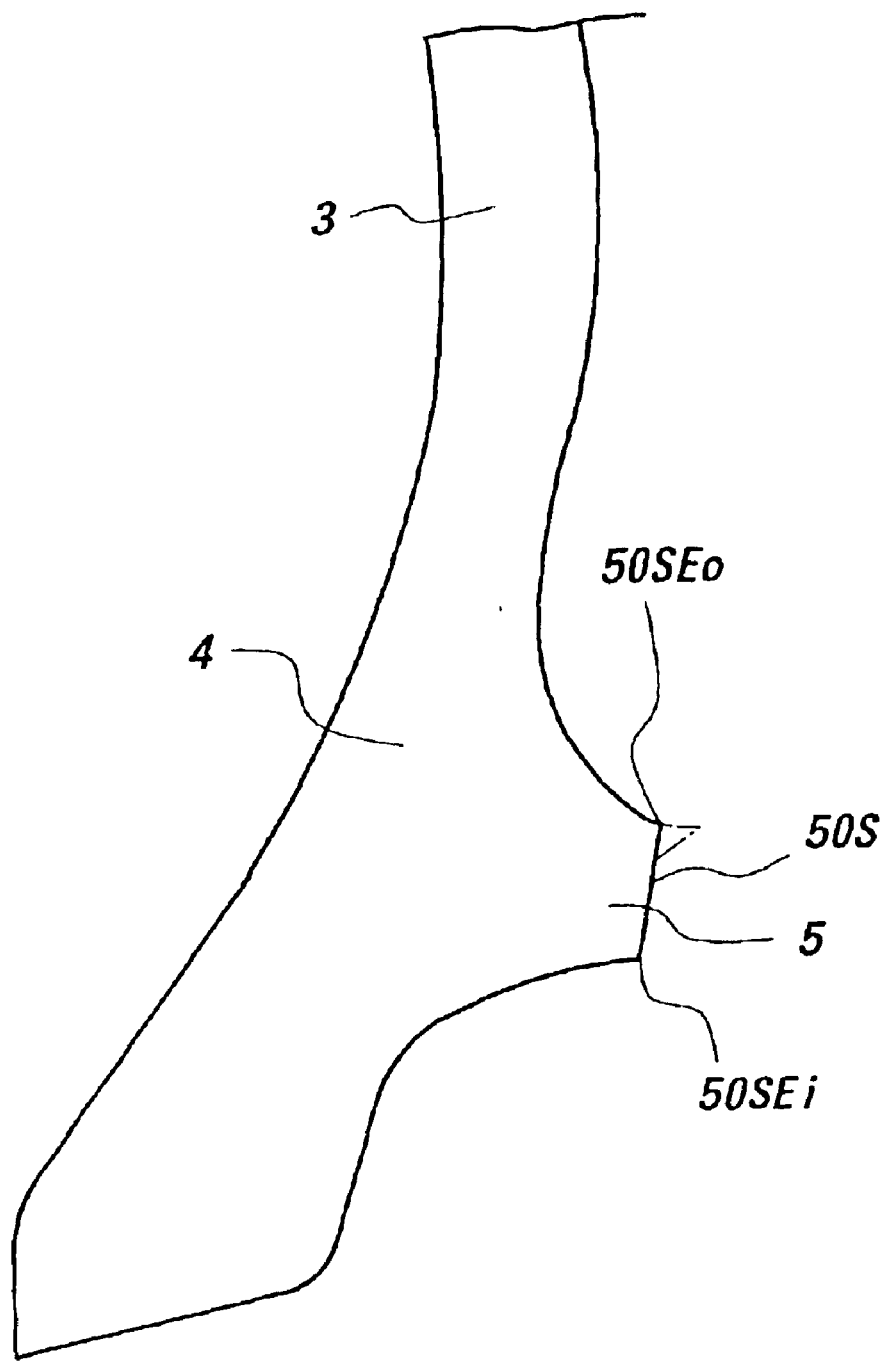
FIG. 2 is an enlarged section view of a main part of the tire shown in FIG. 1.

The chamfered portion facilitates the flowing of air trapped in the depressing portion 15 into each of spaces between the dividing faces 13-1S and 13-2$i$S and between the dividing faces 13-2$o$S and 13-3$i$S and reduces a pressure of the trapped air flowing into these dividing faces, and hence a thickness of "burr" protruded rubber film is made thinner to develop an effect of facilitating a burr-removing operation. Besides, a fine band-shaped rubber formed in the chamfered portion as shown by a phantom line in FIG. 2 brings about an additional value as an ornament for the bead guard 5.

Further, each of the side ring pieces 13-1, 13-2, 13-3 has a structure capable of assembling and dissembling at the side of the same side ring 13, and is favorable to have a structure that the side ring pieces 13-1, 13-2, 13-3 are integrally united with each other to form a one-piece type side ring 13 at a vulcanization shaping time inclusive of opening and closing of a vulcanizing machine provided with a mold or a split type mold 11.

EXAMPLES

There is provided a radial ply tire for a passenger car having a tire size of 225/60R15, wherein a carcass is a rubberized ply of polyester cords of 1500 D/2 and is wound around a bead core embedded in each of a pair of bead portions 4 from an inside of the tire toward an outside thereof up to a neighborhood of a maximum tire width to form a turnup portion and a tread portion 2 has a belt therein and each of the pair of bead portions 4 is provided with a bead guard 5 of a trapezoidal section shape and a bead filler rubber.

Five tires of Example 1 are manufactured by vulcanization-shaping with a split type mold shown in FIGS. 1 and 3 having no chamfered portion, while five tires of Example 2 are manufactured by vulcanization-shaping with a split type mold having chamfered portions. On the contrary, five tires of Conventional Example are manufactured by subjecting the same uncured tire as in the example tire to vulcanization-shaping with a conventional split type mold having many ventholes in positions forming sidewall portion 3 and bead guard 5 and a pair of single side rings. As an evaluation, presence or absence of bare formation, presence or absence of spews, appearance of "burrs" and finish state of sidewall portion 3 and bead portion 4 as a whole are observed, respectively. The observed results are shown in Table 1.

TABLE 1

|  | Example 1 | Example 2 | Conventional Example |
| --- | --- | --- | --- |
| Presence or absence of burr formation | absence | absence | presence |
| Presence or absence of spews burr appearance | absence | absence substantially no burr | presence of many spews require spew removing work spew removal is difficult at corner part of bead guard |
| Finish state of bead portion - sidewall portion | substantially no problem, good | no problem very good | irregular removal of spew, presence of cut damage at corner part of bead guard, poor appearance |

As seen from the results of Table 1, the appearance in the bead guard 5 and the sidewall portion 3 is considerably improved in the tires of Examples 1 and 2 as compared with the conventional tire, and the work of removing spews in these portions is omitted and hence the productivity is improved. In the comparison between the tires of Examples 1 and 2, the chamfering is effective in view of the formation of "burr".

INDUSTRIAL APPLICABILITY

According to the invention, the side ring in the split type mold is a uniting system of annular divided side ring pieces and an edge of a dividing faces between mutually adjoining side ring pieces located at a side of a tire shaping face is positioned in a place corresponding to a bottom of depressing portion for the formation of a bead guard to prevent the formation of bare without forming spews on a bead guard of a pneumatic tire, whereby there can be manufactured a pneumatic tire provided with a bead guard having a given accurate shape and an excellent appearance.

What is claimed is:

1. A method of manufacturing a pneumatic tire comprising a tread portion, a pair of sidewall portions and a pair of bead portions communicating with both sides of the tread portion, and a bead guard disposed in at least one bead portion and protruding outward from the tire by vulcanization-shaping with a split type mold comprising a pair of annular side rings forming the pair of bead portions and the pair of sidewall portions and many split segments for the formation of the tread portion integrally united and engaged with the respective side ring, characterized in that an edge of a dividing face between mutually adjoining side ring pieces by annularly dividing the side ring inward and outward in a radial direction with respect to a center axis line of the split type mold and located at a side of a tire shaping face is positioned in a place corresponding to a depressing portion forming a bead guard.

2. The method according to claim 1, wherein the edge of the dividing face between the adjoining side ring pieces located at the side of the tire shaping face is positioned in a place corresponding to a bottom of the depressing portion.

3. The method according to claim 1, wherein the edge of the dividing face between the adjoining side ring pieces located at the side of the tire shaping face is positioned in a place corresponding to a corner part of the depressing portion forming the bead guard.

4. The method according to claim 1, wherein the edge of the dividing face between the adjoining side ring pieces located at the side of the tire shaping face is positioned in a place corresponding to a deeper corner part among plural corner parts of the depressing portion forming the bead guard.

5. The method according to claim 1, wherein the edge of the dividing face between the adjoining side ring pieces located at the side of the tire shaping face is positioned in a place corresponding to an outward corner part in the radial direction at a side delaying the enlarging deformation of the uncured tire among corner parts adjoining to each other inward and outward in the radial direction in the depressing portion forming the bead guard.

6. A vulcanization split type mold comprising a pair of annular side rings forming a pair of bead portions and a pair of sidewall portions of a pneumatic tire, many split segments for the formation of a tread portion of the pneumatic tire each freely going in and out inward and outward in a radial direction with respect to a center axis line of the side ring and engaging with the respective side ring and a depressing portion formed in at least one side ring for the formation of a bead guard protruding outward from the pneumatic tire in the bead portion, characterized in that the side ring is constructed with two or more side ring pieces annularly divided inward and outward in a radial direction with respect to a center axis line of the split type mold, and the depressing portion is formed in at least two adjoining side ring pieces, and an edge of a divided face between the mutually adjoining side ring pieces located at a side of a tire shaping face is positioned in the depressing portion.

7. A vulcanization split type mold according to claim 6, wherein the edge of the dividing face between the adjoining side ring pieces disposed in the depressing portion and located at the side of the tire shaping face is positioned in a bottom of the depressing portion.

8. A vulcanization split type mold according to claim 6, wherein the edge of the dividing face between the adjoining side ring pieces disposed in the depressing portion and located at the side of the tire shaping face is positioned in a corner part at the bottom of the depressing portion.

9. A vulcanization split type mold according to claim 6, wherein the edge of the dividing face between the adjoining side ring pieces forming the depressing portion and located at the side of the tire shaping face is positioned in a deepest bottom corner part among plural bottom corner parts of the depressing portion.

10. A vulcanization split type mold according to claim 6, wherein the edge of the dividing face between the adjoining side ring pieces forming the depressing portion and located at the side of the tire shaping face is positioned in an outward bottom corner part in the radial direction among plural bottom corner parts separated away from each other in the radial direction of the depressing portion.

11. A vulcanization split type mold according to claim 6, wherein each of the side rings is divided into three or more side ring pieces.

12. A vulcanization split type mold according to claim 6, wherein a chamfered portion specifying a position of the edge of the dividing face located at the side of the tire shaping face is formed in at least one of the mutually adjoining side ring pieces.

13. A vulcanization split type mold according to claim 6, wherein the side ring pieces in each of the side rings have a structure capable of assembling and dissembling them and are integrally united with each other in a vulcanization work inclusive of opening and closing of a vulcanizing machine provided with the mold.

* * * * *